US 8,300,898 B2

(12) United States Patent
Bak et al.

(10) Patent No.: US 8,300,898 B2
(45) Date of Patent: Oct. 30, 2012

(54) REAL-TIME FACE RECOGNITION-BASED SELECTIVE RECORDING APPARATUS AND METHOD

(75) Inventors: Eun-Sang Bak, Ansan-si (KR);
Jong-Tae Kim, Seoul (KR); Jin-Man Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1162 days.

(21) Appl. No.: 11/938,357

(22) Filed: Nov. 12, 2007

(65) Prior Publication Data
US 2009/0016575 A1   Jan. 15, 2009

(30) Foreign Application Priority Data
Jul. 13, 2007   (KR) .................. 10-2007-0070879

(51) Int. Cl.
*G06K 9/00* (2006.01)
(52) U.S. Cl. .................. 382/118; 348/143; 382/103
(58) Field of Classification Search .................. 382/103, 382/118
See application file for complete search history.

(56) References Cited

U.S. PATENT DOCUMENTS

| | | | |
|---|---|---|---|
| 7,315,631 B1 * | 1/2008 | Corcoran et al. ............. | 382/118 |
| 7,346,186 B2 * | 3/2008 | Sharoni et al. ............... | 382/103 |
| 7,359,529 B2 * | 4/2008 | Lee ................................ | 382/103 |
| 7,548,565 B2 * | 6/2009 | Sull et al. ..................... | 370/503 |
| 7,764,736 B2 * | 7/2010 | Comaniciu et al. ......... | 375/240.08 |
| 2002/0122659 A1 * | 9/2002 | McGrath et al. ............. | 386/117 |
| 2002/0176610 A1 * | 11/2002 | Okazaki et al. .............. | 382/118 |
| 2003/0217294 A1 * | 11/2003 | Kyle ............................. | 713/202 |
| 2004/0183951 A1 * | 9/2004 | Lee ............................... | 348/652 |
| 2006/0197845 A1 * | 9/2006 | Masaki ........................ | 348/224.1 |
| 2006/0251384 A1 * | 11/2006 | Vronay et al. ............... | 386/52 |
| 2007/0057933 A1 * | 3/2007 | Ohno et al. ................... | 345/204 |
| 2007/0182823 A1 * | 8/2007 | Maruyama et al. ......... | 348/207.99 |
| 2007/0201836 A1 * | 8/2007 | Tsubota et al. .............. | 386/96 |
| 2007/0268370 A1 * | 11/2007 | Sanno et al. ................ | 348/207.99 |
| 2008/0250037 A1 * | 10/2008 | Date et al. .................... | 707/100 |
| 2009/0009598 A1 * | 1/2009 | Sotodate ...................... | 348/143 |

FOREIGN PATENT DOCUMENTS

| | | |
|---|---|---|
| JP | 10-322637 A | 12/1998 |
| KR | 1998-059003 U | 10/1998 |
| KR | 10-2000-0009742 A | 2/2000 |
| KR | 10-2005-0060628 A | 6/2005 |

* cited by examiner

*Primary Examiner* — Gregory M Desire
(74) *Attorney, Agent, or Firm* — Sughrue Mion, PLLC

(57) ABSTRACT

Provided are a real-time face recognition-based selective recording apparatus and method. The apparatus includes a face recognition unit which recognizes a face of a person in a decompressed input image frame; a recording position setting unit which sets one of an image frame in which the person appears and a scene change start frame including the image frame as a valid recording point if the recognized face is detected for a predetermined period of time or detected a predetermined number of times, and identifies a position, which corresponds to a set image frame, in an image compression stream; and a recording unit which records the image compression stream from the identified position and storing the recorded image compression stream in real time.

17 Claims, 3 Drawing Sheets

REAL-TIME FACE RECOGNITION-BASED SELECTIVE RECORDING APPARATUS AND METHOD

This application claims priority from Korean Patent Application No. 10-2007-0070879 filed on Jul. 13, 2007 in the Korean Intellectual Property Office, the disclosure of which is incorporated herein by reference in its entirety.

BACKGROUND OF THE INVENTION

1. Field of the Invention

Apparatuses and methods consistent with the present invention relate to real-time face recognition-based selective recording, and more particularly, to selecting, in real time, a scene section, in which a selected person appears, from a material broadcast on a digital television or data already recorded on a storage medium and recording the selected scene section.

2. Description of the Related Art

Today, people are may be provided with a flood of digital media information. As individuals can easily obtain desired information from media such as the Internet or television, the amount of information that they obtain and store is increasing to such an extent that it is difficult to manage the information.

Accordingly, the desire to select desired information from a lot of information and store the selected information is increasingly growing. Image data is no exception. The desire to record a desired person or section of image data, such as news or drama broadcast on television, instead of recording the entire image data from the beginning to the end is growing.

In order to satisfy this desire, a related art recording method includes recording method records image data such as news or drama from the beginning to the end, storing the recorded image data, setting indices for scenes in which a desired person appears while checking stored images, and searching the image data with reference to the set indices.

However, it is difficult to secure storage space for recording and storing the entire image data, which is broadcast, according to the related art recording method. In addition, a user has to search for every piece of the stored image data in order to set indices for scenes in which a desired person appears.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

According to an aspect of the present invention, there is provided a real-time face recognition-based selective recording apparatus including a face recognition unit recognizing the face of a person in a decompressed input image frame; a recording position setting unit setting one of an image frame in which the person appears and a scene change start frame including the image frame as a valid recording point if the recognized face is detected for a predetermined period of time and identifying a position, which corresponds to a set image frame, in an image compression stream; and a recording unit recording the image compression stream from the identified position and storing the recorded image compression stream in real time.

According to another aspect of the present invention, there is provided a real-time face recognition-based selective recording method including recognizing the face of a person in a decompressed input image frame; setting one of an image frame in which the person appears and a scene change start frame including the image frame as a valid recording point if the recognized face is detected for a predetermined period of time and identifying a position, which corresponds to a set image frame, in an image compression stream; and recording the image compression stream from the identified position and storing the recorded image compression stream in real time.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Figure 1:
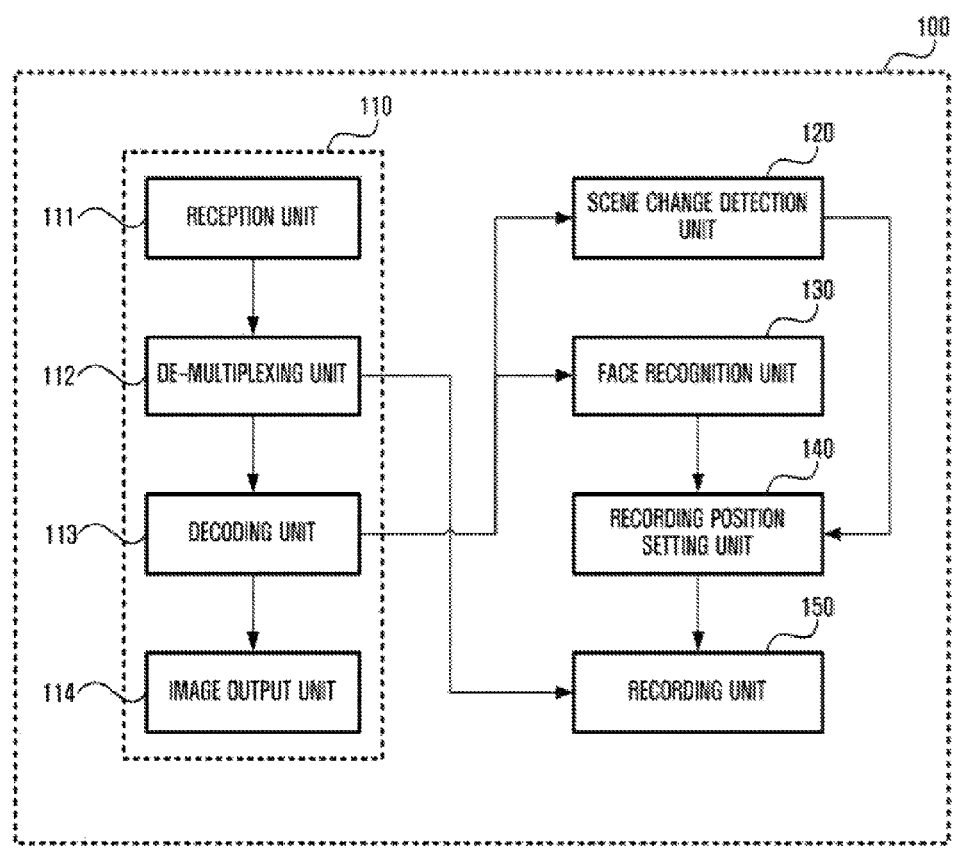
FIG. 1 is a block diagram of a real-time face recognition-based selective recording apparatus according to an exemplary embodiment of the present invention.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. Like reference numerals in the drawings denote like elements, and thus their description will be omitted.

Hereinafter, a real-time face recognition-based selective recording apparatus and method will be described with reference to block diagrams or flowchart illustrations. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus, such that the instructions, which are executed via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

FIG. 1 is a block diagram of a real-time face recognition-based selective recording apparatus 100 according to an exemplary embodiment of the present invention.

Referring to FIG. 1, the apparatus 100 includes a digital media renderer 110, a scene change detection unit 120, a face recognition unit 130, a recording position setting unit 140, and a recording unit 150. The digital media renderer 110 receives compressed image data, decompresses the received image data, and renders the decompressed image data. The scene change detection unit 120 determines whether a scene change has occurred in an input image frame. The face recognition unit 130 recognizes a face of a person in a decompressed input image frame. If the recognized face is detected for a predetermined period of time, the recording position setting unit 140 sets one of an image frame in which the person appears and a scene change start frame including the image frame as a valid recording point and identifies a position, which corresponds to the set image frame, in an image compression stream. The recording unit 150 records the image compression stream from the identified position and stores the recorded stream in real time.

Each component illustrated in FIG. 1 means, but is not limited to, a software or hardware component, such as a Field Programmable Gate Array (FPGA) or Application Specific Integrated Circuit (ASIC), which performs certain tasks.

Each component may advantageously be configured to reside on the addressable storage medium and configured to execute on one or more processors. Thus, each component may include, by way of example, software components, object-oriented software components, class components and task components, processes, functions, attributes, procedures, subroutines, segments of program code, drivers, firmware, microcode, circuitry, data, databases, data structures, tables, arrays, and variables. The functionality provided for in the components may be combined into fewer components or further separated into additional components.

More specifically, the digital media renderer 110 of the apparatus 100 illustrated in FIG. 1 receives compressed image data, decompresses the received image data, and renders the decompressed image data.

To this end, the digital media renderer 110 includes a reception unit 111, a de-multiplexing unit 112, a decoding unit 113, and an image output unit 114. The reception unit 111 receives an image compression stream in which an image signal and an audio signal are compressed in a predetermined format. The de-multiplexing unit 112 separates the compressed image signal and the compressed audio signal from the image compression stream received by the reception unit 111. The decoding unit 113 decodes the compressed image signal and the compressed audio signal which were separated from the image compression stream by the de-multiplexing unit 112. The image output unit outputs the image signal decoded by the decoding unit 113 on a display unit (not shown) at a predetermined frame speed.

As used herein, the term "image compression stream" encompasses a moving-image compression stream such as a transport stream. The reception unit 111 includes a tuner receiving a broadcast signal or a storage medium reader receiving stored data.

The scene change detection unit 120 determines whether a scene change has occurred in an image frame received from the digital media renderer 110.

The term "scene change" encompasses a shot change, and the term "shot" denotes that a person or a part is photographed from a different angle due to a camera change.

That is, the scene change detection unit 120 analyzes an input image frame and a previous image frame and transmits to the recording position setting unit 140 position information of the input image frame in the image compression stream if a scene change or a shot change occurs in the input image frame.

More specifically, data input to the scene change detection unit 120 and the face recognition unit 130 is a decompressed image frame, and data recorded and stored by the recording unit 150 is a image compression stream in a compressed form. Therefore, the recording unit 150 has to identify a position, which corresponds to each decompressed image frame, in the image compression stream in order to record a section of the image compression stream desired by a user or record the image compression stream for a period of time desired by the user.

Hence, if a scene change occurs in a decompressed input image frame, the scene change detection unit 120 identifies a position, which corresponds to the image frame having the scene change, in the image compression stream and transmits the identified position to the recording position setting unit 140. When a scene change is set as a basic recording unit, the recording unit 150 records not all of the received image compression stream but a scene change section identified by the scene change detection unit 120.

The face recognition unit 130 recognizes the face of a person in a decompressed input image frame.

To this end, the face recognition unit 130 detects the face in each input image frame by determining whether the face exists in each input image frame and extracts feature values representing features of the detected face.

Then, the face recognition unit 130 compares the extracted feature values of the detected face to feature values representing facial features of the person desired by the user and recognizes the face.

The present invention may further include an image input unit (not shown) which receives the face of the person desired by the user in advance in the form of an image and identifies, in advance, the feature values representing the facial features of the person.

In a real-time face recognition-based selective recording method according to an exemplary embodiment of the present invention, when the face of a person desired by a user is recognized, a recording operation is performed using a scene change as a basic recording unit. In a real-time face recognition-based selective recording method according to another exemplary embodiment of the present invention, a recording operation is performed for a predetermined period of time from when the face of a person was recognized.

According to the method of performing a recording operation when the face of a person desired by a user is recognized, if a face recognized by the face recognition unit 130 is detected for a predetermined period of time, the recording position setting unit 140 sets one of an image frame in which the face first appears and a scene change start frame including the image frame as a valid recording point.

Then, if a next scene change occurs and an image frame in which the face does not appear is input, the recording position setting unit 140 sets an image frame in which the next scene change occurs as a recording end point. Thus, a recording section in which the face appears is set, and the recording unit 150 records a portion of the image compression stream, which corresponds to the recording section, and stores the recorded portion in real time.

Alternatively, when the recognized face is detected a predetermined number of times, rather than for a predetermined period of time, an image frame in which a scene change occurs may also be set as the valid recording point.

If the face recognized by the face recognition unit 130 is not detected for the predetermined period of time, the recording position setting unit 140 sets one of the image frame in which the face first appears and the scene change start frame including the image frame as an invalid recording point. Then, the recording position setting unit 140 sets one of the image frame in which the face first appears and the scene change start frame including the image frame as an invalid recording end point Accordingly, the recording unit 150 removes an unnecessary portion of the image compression stream, which is continuously stored, in order to efficiently utilize storage space. In this case, the unnecessary portion of the image compression stream corresponds to a section between the invalid recording point and the invalid recording end point.

If the recognized face is not detected a predetermined number of time, an image frame in which a scene change occurs may also be set as the invalid recording point.

According to the method of performing a recording operation for a predetermined period of time from when the face of a person is recognized, if a face is recognized by the face recognition unit 130, the recording position setting unit 140 sets an image frame in which the face appears as the valid recording point and sets an image frame received after a predetermined period of time as the valid recording end point so that a recording operation can be performed for the predetermined period of time.

The length of recording time may vary in proportion to a period of time during which a person appears or the number of times that the person appears.

The apparatus 100 described above can selectively record a plurality of input moving images in real time when there are a plurality of television tuners and can be applied regardless of a compression method of the image moving images.

Figure 2:
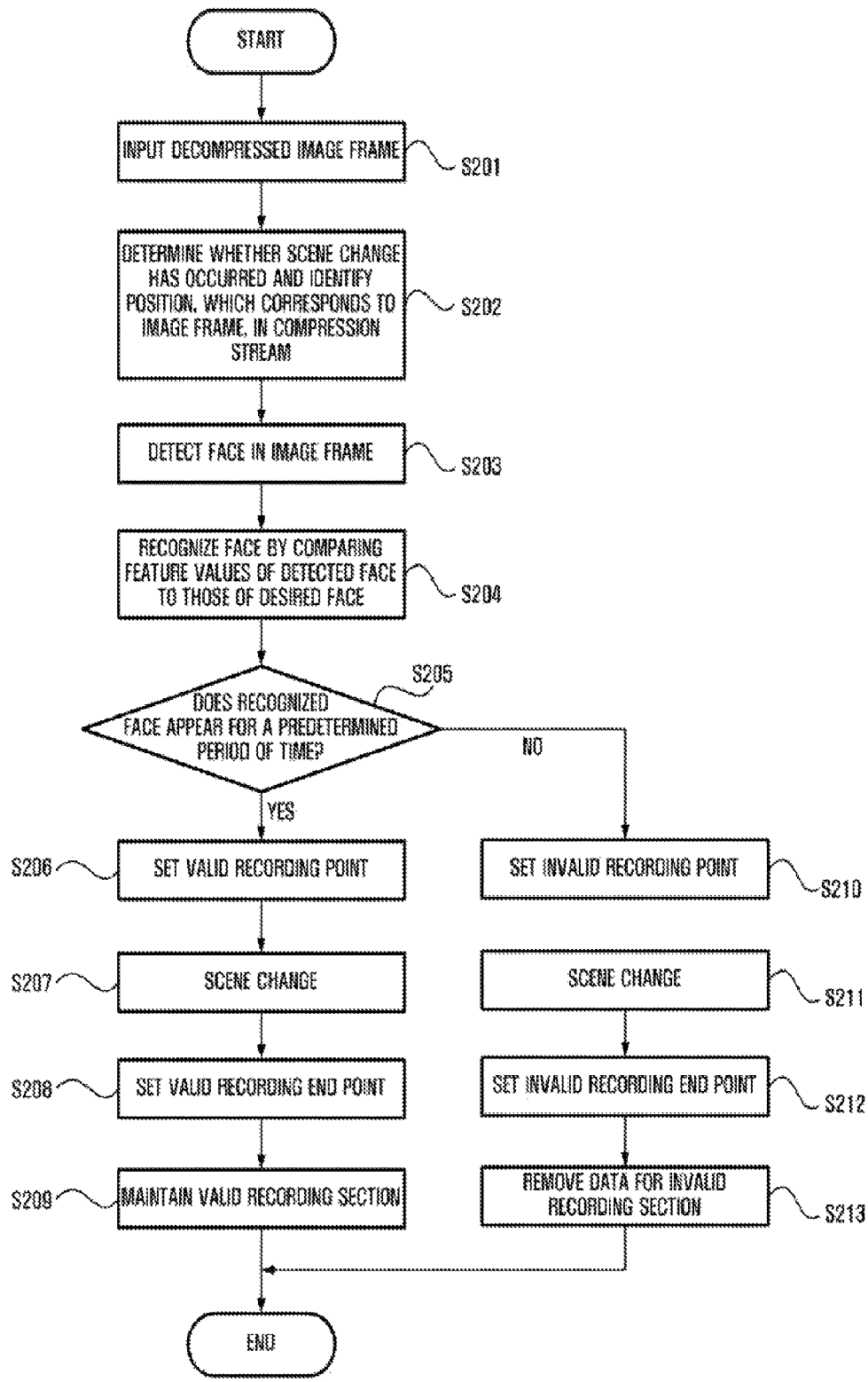
FIG. 2 is a flowchart illustrating a real-time face recognition-based selective recording method according to an exemplary embodiment of the present invention.

FIG. 2 is a flowchart illustrating a real-time face recognition-based selective recording method according to an exemplary embodiment of the present invention.

For ease of description, the method will be described with reference to the apparatus 100 of FIG. 1, and it is assumed that feature values representing facial features of a person desired by a user already exist.

Referring to FIG. 2, a decompressed image frame is input from the digital media renderer 110 (operation S201).

After operation S201, the scene change detection unit 120 determines whether a scene change has occurred in the input image frame and identifies a position, which corresponds to the image frame, in a image compression stream if the scene change has occurred in the image frame (operation S202).

If the scene change has occurred in the input image frame, the recording unit 150 starts a recording operation from the image frame.

That is, the recording unit 150 records the image compression stream from the position corresponding to the image frame in which the scene change has occurred and stores the recorded image compression stream.

After operation S202, the face recognition unit 130 determines whether a face exists in each input image frame and detects the face (operation S203).

After operation S203, the face recognition unit 130 detects feature values representing the detected face, compares the detected feature values to feature values representing the face desired by the user, and thus recognizes the face (operation S204).

After operation S204, the recording position setting unit 140 determines whether the face recognized by repeating operations S201 through S204 appears for a predetermined period of time (operation S205).

Alternatively, the recording position setting unit 140 may determine whether the recognized face appears a predetermined number of times.

If the determination result indicates that the recognized face appears for the predetermined period of time, the recording position setting unit 140 sets one of an image frame in which the recognized face appears and a scene change start frame including the image frame as a valid recording point (operation S206).

After operation S206, if the scene change detection unit 120 detects a scene change (operation S207), the recording position setting unit 140 sets an image frame in which the scene change has occurred as a valid recording end point (operation S208).

After operation S208, the recording unit 150 maintains a valid recording section of the image compression stream (operation S209).

As a result of operation S205, if the recognized face does not appear for the predetermined period of time, the recording position setting unit 140 sets the image frame in which the recognized face appears and a scene change termination frame including the image frame as an invalid recording point (operation S210).

After operation S210, if the scene change detection unit 120 detects a scene change (operation S211), the recording position setting unit 140 sets an image frame in which the scene change was detected as an invalid recording end point (operation S212).

After operation S212, the recording unit 150 removes data for an invalid recording section from the image compression stream (operation S213).

That is, the method illustrated in FIG. 2 stores a scene change section if a desired face appears in the scene change section for a predetermined period of time or a predetermined number of times and removes the scene change section if the desired face does not appear in the scene change section for the predetermined period of time or the predetermined number of times, thereby enhancing the efficiency of storage space.

Figure 3:
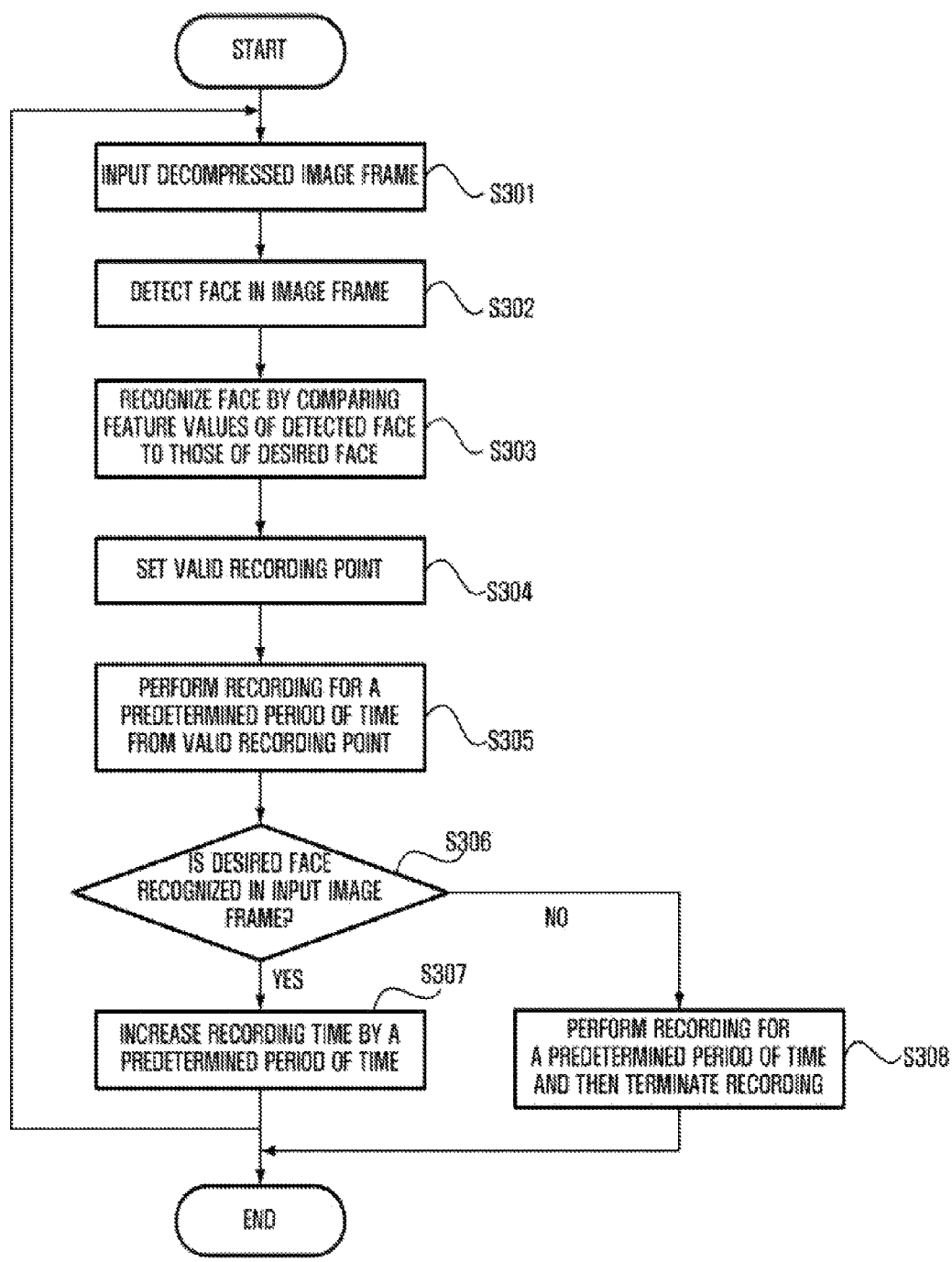
FIG. 3 is a flowchart illustrating a real-time face recognition-based selective recording method according to another exemplary embodiment of the present invention.

FIG. 3 is a flowchart illustrating a real-time face recognition-based selective recording method according to another exemplary embodiment of the present invention.

For ease of description, the method will be described with reference to the apparatus 100 of FIG. 1, and it is assumed that feature values representing facial features of a person desired by a user already exist.

Referring to FIG. 3, a decompressed image frame is input from the digital media renderer 110 (operation S301).

After operation S301, the face recognition unit 130 determines whether a face exists in each input image frame and detects the face (operation S302).

After operation S302, the face recognition unit 130 detects feature values representing the detected face, compares the detected feature values to the feature values of the face desired by the user, and thus recognizes the face (operation S303).

After operation S303, the recording position setting unit 140 determines an image frame in which the face appears as a valid recording point (operation S304).

After operation S304, the recording unit 150 performs a recording operation from the image frame set as the valid recording point in operation S304 (operation S305).

After operation S305, if the face is recognized in the input image frame after operations S301 through S305 are repeated (operation S306), the recording position setting unit 140 increases recording time by a predetermined period of time (operation S307).

If the face is not recognized even after operations S301 through S305 are repeated, the recording unit 150 performs a recording operation for a predetermined period of time and then terminates the recording operation (operation S308).

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in descriptive sense only and not for purposes of limitation.

What is claimed is:

1. A recording apparatus comprising:
    a face recognition unit which recognizes a face of a person in a decompressed input image frame;
    a recording position setting unit which sets a scene change start frame comprising an image frame in which the person appears as a valid recording point if the recognized face is detected for a predetermined period of time or detected a predetermined number of times, and identifies a position, which corresponds to the set scene change start frame, in an image compression stream; and
    a recording unit which records the image compression stream from the identified position, and stores the recorded image compression stream in real time,
    wherein the recording unit deletes the recorded image stream if the recognized face is not detected for the predetermined period of time or the predetermined number of times.

2. The apparatus of claim 1, further comprising a scene change detection unit which determines whether a scene change has occurred in the input image frame.

3. The apparatus of claim 1, wherein the face recognition unit detects the face in the input image frame and extracts feature values representing features of the detected face.

4. The apparatus of claim 3, wherein the face recognition unit recognizes the face by comparing the extracted feature values to feature values representing facial features of the person.

5. The apparatus of claim 1, wherein, if the recognized face is not detected for the predetermined period of time, the recording position setting unit sets the scene change start frame as an invalid recording point.

6. The apparatus of claim 5, wherein the recording unit removes data recorded from the set invalid recording point.

7. The apparatus of claim 1, wherein, if the recognized face is not detected the predetermined number of times, the recording position setting unit sets the scene change start frame as an invalid recording point.

8. The apparatus of claim 7, wherein the recording unit removes data recorded from the set invalid recording point.

9. A recording method comprising:
    recognizing a face of a person in a decompressed input image frame;
    setting a scene change start frame in which the person appears as a valid recording point if the recognized face is detected for a predetermined period of time or detected a predetermined number of times;
    identifying a position, which corresponds to the set scene change start frame, in an image compression stream;
    recording the image compression stream from the identified position and storing the recorded image compression stream in real time on a recording medium; and
    deleting the recorded image compression stream if the recognized face is not detected for the predetermined period of time or the predetermined number of times,
    wherein at least one of the recognizing, the setting, the identifying, and the recording is implemented by a hardware processor.

10. The method of claim 9, further comprising determining whether a scene change has occurred in the input image frame.

11. The method of claim 9, wherein the recognizing the face comprises detecting the face in the input image frame and extracting feature values representing features of the detected face.

12. The method of claim 11, wherein the recognizing the face comprises recognizing the face by comparing the extracted feature values to feature values representing facial features of the person.

13. The method of claim 9, wherein the scene change start frame is set as an invalid recording point if the recognized face is not detected for the predetermined period of time.

14. The method of claim 13, wherein the recording the image compression stream comprises removing data recorded from the set invalid recording point.

15. The method of claim 9, wherein the scene change start frame is set as an invalid recording point if the recognized face is not detected the predetermined number of times.

16. The method of claim 15, wherein the recording of the image compression stream comprises removing data recorded from the set invalid recording point.

17. A recording method comprising:
    receiving a decompressed image frame corresponding to an image compression stream;
    recording and storing a section of the image compression stream beginning at the decompressed image frame;
    determining whether a face is detected for a predetermined period of time or for a predetermined number of times in the recorded section of the image compression stream; and
    removing the recorded section if it is determined that the face is not detected for the predetermined period of time or the predetermined number of times in the recorded section.

* * * * *